July 31, 1956     G. D. COLLINS     2,756,678
ELECTROMAGNETIC PUMP
Filed Nov. 22, 1954
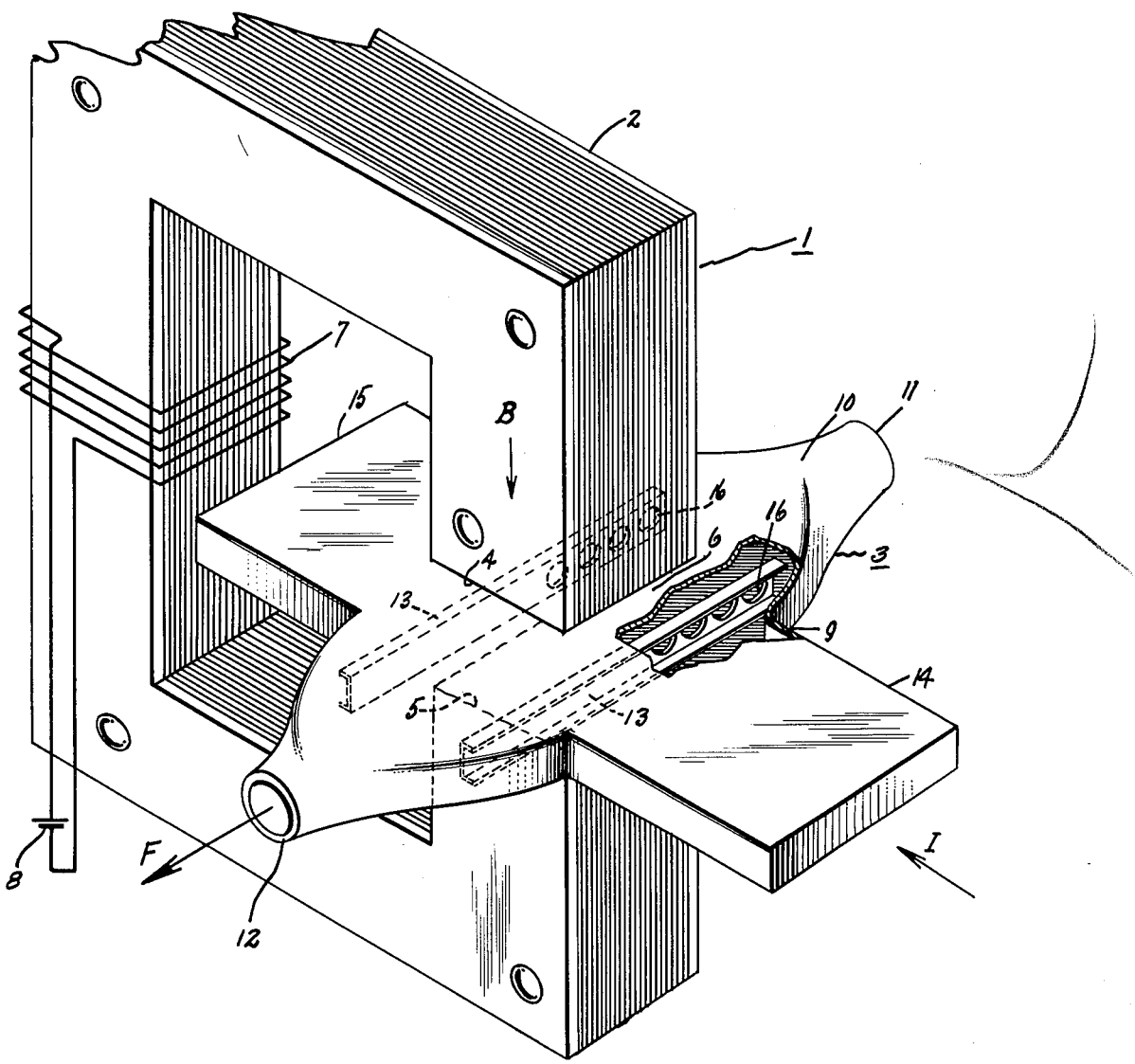
Inventor
Gordon D. Collins
by Merton D. Morse
His Attorney United States Patent Office 2,756,678
Patented July 31, 1956

2,756,678

ELECTROMAGNETIC PUMP

Gordon D. Collins, Schenectady, N. Y., assignor to General Electric Company, a corporation of New York Application November 22, 1954, Serial No. 470,460

6 Claims. (Cl. 103—1)

My invention relates to electromagnetic pumps. More particularly, it relates to electromagnetic pumps having an improved operating range and efficiency.

Electromagnetic pumps for the pumping of fluid metals and other electric current conducting fluids are well known. Their operation is based on the fact that when a flux B and current I are flowing perpendicular one to the other, a force F mutually perpendicular to the flux and current is generated. Hence, if a fluid or fluidized metal such as mercury, sodium, potassium, or other electric current conducting material is placed in a conduit or duct and a current passed transversely through the conduit and material in one direction and a magnetic flux component caused to pass transversely through the conduit and material perpendicular to the current flow, a force will be generated lengthwise in the conduit causing the material to flow therethrough. The direction of flow is fixed by adjusting the relative direction of the lines of flux and current according to the left hand rule.

Normally electromagnetic pumps are constructed with a conduit which is relatively wide as compared to its height in the pumping region which is placed between the poles of an electromagnet so that the flux or field in the pole gap will be as great as possible.

In the usual pump of the type described, the so-called armature reaction due to the magnetic field produced about a conductor carrying a current, in this case a transverse section through the conduit and the conducting material between the magnetized poles, results in inefficient functioning. Because of this armature reaction the magnetic field shifts upstream or toward the fluid inlet, the lines of flux concentrating to a greater extent at this point. Likewise, as the fluid flow increases, the current tends to concentrate downstream or toward the fluid outlet. This in turn results in a further concentration of the flux in an upstream direction. The net result is a low pumping efficiency and an unduly restricted pressure operating range. An object of my invention is to provide a simple means to counteract or essentially nullify the armature reaction in electromagnetic pumps whereby their pressure operating range and efficiency is improved.

Briefly stated, my invention comprises providing reduced electrical contact resistance to the flow of current in the region of the fluid inlet end or where the flux is concentrated and relatively more resistance to such flow toward the fluid outlet end of the pump where the current tends to concentrate. This is provided very simply in pump conduits having reinforcing channels or ribs of electrically resistive material, usually metal, running lengthwise of the conduit by perforating the ends of such reinforcement members in the region of the fluid inlet end of the pump. Pumps not having such reinforcing vanes may be provided with a similar structure. In this manner concentration of flux and current in any regions of the conduit is obviated and their distribution equalized or smoothed out over the duct affected by the current and flux.

The features of my invention which I believe to be novel are set forth with particularity in the claims appended hereto. My invention itself, however, both as to its organization and method of operation, together with further objects thereof will be better understood from a consideration of the following description and the drawing in which the single figure illustrates a preferred embodiment of my invention.

Referring now to the drawing, there is shown an electromagnetic pump 1 comprising an electromagnet 2 for generating a flux and a conduit 3. Electromagnet 2 is shown in elementary form as of the familiar horse-shoe type having two pole faces 4 and 5 defining an air gap 6, through which lines of flux flow from pole-to-pole when the magnet is energized. It is preferably made of magnetic material, preferably laminated if A.-C. current is used, and has wound about one of its legs a magnetizing coil 7 which is energized by an appropriate source of electrical energy 8.

Between the pole faces 4 and 5 is situated the fluid conduit portion 9 of the pump. As shown this conduit has a relatively large width compared to its height in order to provide as great as possible a concentration of flux through it and its contained fluid 10. The inlet 11 and outlet 12 of the conduit may be necked in beyond the pole faces, as shown, to the normal shape of the external conduit. Conduit 9 is made of any metal which will contain the fluid 10 without undue corrosion. Preferably the metal walls are relatively thin so that the flux between pole faces 4 and 5 passes largely through the fluid metal 10 within the duct. Provided within conduit 9 and running lengthwise thereof are one or more vanes, struts, or ribs 13 fixed to the upper and lower walls of the conduit and which serve to reinforce and support the conduit.

Connected electrically to the sides of conduit 9 are electrodes 14 and 15 in circuit with a source of current not shown, which serve to supply current to and through the conduit 9 and the adjacent portion of the fluid 10 contained therein. The current also passes through supporting vanes or partitions 13 and it is in the construction of these vanes that the crux of my invention resides. This current may be either a D.-C. or single phase A.-C. current.

As pointed out above, in a usual electromagnetic pump of the type described herein the magnetic field surrounding the path of current through electrode 14 through conduit 9, fluid 10 contained therein and thence to electrode 15 causes the magnetic field to shift upstream toward fluid inlet 11 resulting in a relatively greater concentration of lines of flux in this region. As the fluid flow rate increases, the current on the other hand tends to concentrate downstream toward fluid outlet 12. This downstream concentration of current, in turn, increases the flux concentration upstream.

In order to overcome these tendencies which lead to poor operating efficiency and a restricted pressure working range, I restrict or decrease the upstream contact area of vane or vanes 13 which is presented to the flow of current. I may do this in any of a number of ways as by perforations, slots, or holes of various shapes therein. I have found that round holes such as shown at 18 accomplish the purpose very well and at the same time detract as little as possible from the reinforcing role of the vanes 13, though square holes or slots of appropriate size, properly spaced or distributed will serve as well.

By providing holes 16 in the upstream portion of vanes 13, the contact resistance between the fluid metal or electrically conducting material 10 being pumped and these portions of vanes 13, is less in the region of greatest flux. Stated otherwise, the contact resistance is greatest in the downstream region where the concentration of current is greatest. The overall result is that the flux and current do not concentrate in any one region due to the field created by the current I through the system and the distribution of flux B and current distribution is uniform through the duct and liquid 10. The working pressure range of the pump is thus increased, as well as the efficiency for any power input.

While I have shown the holes 16 as being of a certain number, shape, and size spaced evenly in vanes 13 they may be of any desired number, size, shape or spacing to suit the particular requirements of any installation.

If the reinforcing effect of the vanes 13 is not required in a particular case, such vanes may be made to extend over only a portion of the lengthwise extent or height of the pump conduit and may be made without perforations, the electrical contact resistance in any portion of the conduit for smoothing out the flux density and current flow being provided for by the area of the vane perpendicular to current flow and its distribution or arrangement in the conduit. The vanes may be tapered or otherwise shaped lengthwise so that the proper distribution of resistance to current flow is obtained.

By my invention, I have provided simple means for improving the functioning of electromagnetic pumps.

While I have described my invention with respect to certain embodiments, it will be realized that changes may be made therein without departing from the spirit and scope of the following claims which are intended to cover all such changes.

What I claim as new and desire to secure by Letters Patent of the United States is:

1. In an electromagnetic pump having a duct for the passage of an electrically conductive fluid, means to create a magnetic flux transversely through said duct and contained fluid, and means to pass an electric current transversely through said duct and fluid perpendicular to the direction of said flux, means within said duct for equalizing the distribution of flux and current therein, said means comprising structure for decreasing the resistance to current flow through those parts of said duct in which said flux would normally tend to concentrate due to the magnetic field about the path of said current.

2. In an electromagnetic pump having a duct for the passage of an electrically conductive fluid, means to create a magnetic flux transversely through said duct and contained fluid and means to pass an electric current transversely through said duct and contained fluid in a direction perpendicular to said flux, means within said duct for equalizing the lengthwise distribution of flux and current density therein, said means comprising longitudinally disposed electrically resistive partitions having transverse perforations therein of such size, shape, location, and distribution that the electrical resistance through said duct in the direction of current flow is controlled to substantially equalize the distribution of flux and current density therein.

3. An electromagnetic pump for pumping electrically conductive fluid comprising a conduit for the passage of said fluid, means for passing a magnetic flux through said conduit and fluid in one direction perpendicular to the direction of flow of fluid in said conduit, means for passing an electric current through said duct and fluid contained therein in a direction mutually perpendicular to the direction of said flux and said current and at least one conduit-reinforcing vane disposed lengthwise in said conduit, said vane having one or more perforations therein so disposed as to lessen the electrical contact resistance between fluid in said duct and said vane in regions of flux concentration whereby the flux is distributed equally throughout said conduit.

4. In an electromagnetic pump having a duct for the passage of an electrically conductive fluid, means to create a magnetic flux transversely through said duct and contained fluid, and means to pass an electric current transversely through said duct and contained fluid in a direction perpendicular to said flux, means within said duct for equalizing the lengthwise distribution of flux and current density therein, said means comprising longitudinally disposed metal partitions having transverse perforations therein of such size, shape, location, and distribution that the electrical resistance through said duct in the direction of current flow is controlled to substantially equalize the distribution of flux and current density therein.

5. An electromagnetic pump for pumping electrically conducting fluid comprising a conduit for the passage of said fluid, means for passing a magnetic flux in one direction perpendicular to the length of said conduit and means for passing an electric current through said conduit and fluid contained therein in a direction mutually perpendicular to the direction of the flux and the length of the conduit whereby said fluid is forced through said conduit, said conduit having therein at least one lengthwise and vertically disposed electrically resistive vane having perforations therein so disposed as to counteract the concentration of flux and current in any region of said conduit and fluid by controlling the electrical resistance to the current.

6. An electromagnetic pump for pumping electrically conductive fluid comprising a conduit for the passage of said fluid, means for passing a magnetic flux through said conduit and fluid perpendicular to the length of said conduit, means for passing an electric current through said conduit and fluid in a direction mutually perpendicular to the direction of said flux and the length of said conduit and an electrically resistive structure extending substantially longitudinally within said conduit having a nonuniform area, said structure presenting along the length of the conduit a nonuniform resistance to current flow to provide substantially uniform magnetic flux and current density throughout the length of said conduit and contained fluid.

References Cited in the file of this patent

UNITED STATES PATENTS

| | | |
|---|---|---|
| 2,558,698 | Wade | June 26, 1951 |
| 2,686,474 | Pulley | Aug. 17, 1954 |

FOREIGN PATENTS

| | | |
|---|---|---|
| 698,623 | Great Britain | Oct. 21, 1953 |